(12) United States Patent
Ino et al.

(10) Patent No.: US 7,279,236 B2
(45) Date of Patent: Oct. 9, 2007

(54) LUMINESCENT-FILM-COATED PRODUCT

(75) Inventors: Juichi Ino, Tokyo (JP); Hidetoshi Fukuchi, Tokyo (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 0 days.

(21) Appl. No.: 11/077,258

(22) Filed: Mar. 11, 2005

(65) Prior Publication Data

US 2005/0158526 A1    Jul. 21, 2005

Related U.S. Application Data

(63) Continuation of application No. PCT/JP03/11414, filed on Sep. 8, 2003.

(30) Foreign Application Priority Data

Sep. 12, 2002  (JP) .............................. 2002-266269

(51) Int. Cl.
*B32B 5/16*    (2006.01)
(52) U.S. Cl. ..................... 428/690; 207/325; 207/332
(58) Field of Classification Search ................ 428/917, 428/636, 323, 325, 327, 339, 690, 204, 207, 428/913, 332; 203/72; 106/415
See application file for complete search history.

(56) References Cited

U.S. PATENT DOCUMENTS

| | | | | |
|---|---|---|---|---|
| 3,331,699 A | * | 7/1967 | Marshall et al. | ............ 106/415 |
| 5,753,371 A | * | 5/1998 | Sullivan et al. | ............. 428/406 |
| 6,210,777 B1 | * | 4/2001 | Vermeulen et al. | ...... 428/195.1 |
| H1975 H | * | 7/2001 | Rosendale et al. | .......... 523/171 |

FOREIGN PATENT DOCUMENTS

| | | |
|---|---|---|
| JP | 60-221702 | 11/1985 |
| JP | 10-88025 | 4/1998 |
| JP | 11-130992 | 5/1999 |
| JP | 2001-030404 | * 2/2001 |
| JP | 2001-158867 | 6/2001 |
| JP | 2002-45786 | 2/2002 |
| JP | 2002-326331 | 11/2002 |

\* cited by examiner

*Primary Examiner*—Rena Dye
*Assistant Examiner*—Camie S. Thompson
(74) *Attorney, Agent, or Firm*—Manabu Kanesaka

(57) ABSTRACT

A luminescent-film-coated product includes a substrate, a first layer of a transparent resin matrix containing a phosphorescent material and/or a fluorescent material, and a second layer of a transparent resin matrix containing a shiny pigment made of glass flakes coated with a high-refractive-index metal oxide. Another luminescent-film-coated product includes a substrate and a layer of a transparent resin matrix containing a phosphorescent material and/or a fluorescent material and a shiny pigment. Another luminescent-film-coated product includes a substrate, a first layer of a transparent resin matrix containing a shiny pigment made of glass flakes coated with silver, gold, nickel, or a high-refractive-index metal oxide, and a second layer of a transparent resin matrix containing a phosphorescent material and/or a fluorescent material, in which the shiny pigment has a maximum visible light reflectance of 30% or more. A product coated with a luminescent film, for example, warning/safety signs, position signs, and ornaments having good visibility and design can be provide by suitably combining a phosphorescent or fluorescent material and a shiny pigment.

45 Claims, No Drawings

LUMINESCENT-FILM-COATED PRODUCT

RELATED APPLICATIONS

This application is a continuation of International Application No. PCT/JP03/11414, filed Sep. 8, 2003, and claims priority from, Japanese Application Number 2002-266269, filed Sep. 12, 2002, the disclosure of which is hereby incorporated by reference herein in its entirety.

CROSS REFERENCE TO RELATED APPLICATION

This is a continuation application of PCT/JP03/11414 filed on Sep. 8, 2003.

BACKGROUND OF THE INVENTION

1. Field of the Invention

The present invention relates to products coated with a highly shiny film containing a phosphorescent material and/or a fluorescent material. The luminescent-film-coated products according to the present invention are used for, for example, warning/safety signs, position signs, and ornaments.

2. Description of the Related Art

There are conventionally known shiny pigments, including aluminum flake powder, graphite flake particles, glass flakes, silver-coated glass flakes, and mica flake particles or glass flakes coated with a metal oxide such as titanium dioxide and iron oxide. Such shiny pigments show shininess, sparkling with light reflected on their surfaces. Paintwork using paints containing the shiny pigments, line drawings or prints using inks containing the shiny pigments, or resin products produced by molding resin compositions containing the shiny pigments provide a wide variety of beautiful, distinctive appearances in combination with the color tone of a base material (or a substrate for the film). Thus the shiny pigments have a wide range of applications, including automobiles, motorcycles, office automation equipment, cellular phones, household electrical appliances, various printed matters, and writing instruments.

On the other hand, products coated with a film containing a phosphorescent or fluorescent material have a wide variety of applications. Examples of the applications include glow-in-the-dark signs; switches and outlets; flashlights; darkroom items; non-slip stair treads; handrails; baseboards; tiles; floor faces; wall signs; phosphorescent signs; direction signs; various signs for shelter items, survival kits, fire extinguishers, fire hydrants, fire alarms, life preservers, smoke control systems, and so forth; markings for indicating the number of stairs; ornaments such as ashtrays, lighters, cigarette cases, necklaces, earrings, tablecloths, door curtains, lampshades, wallpaper, and fibers; toys; angling gear; stationery; novelties; and fishing gear.

Japanese Unexamined Patent Application Publication No. 2001-158867 discloses an ink composition produced by mixing a phosphorescent or fluorescent material, a shiny pigment, and a resin to improve the design of handwriting. In this publication, glass flakes coated with nickel or silver are used as the shiny pigment.

The technique disclosed in Japanese Unexamined Patent Application Publication No. 2001-158867, however, has difficulty in achieving sufficient improvements in brightness and design because the shiny pigment, which has the light-shielding metal coating, tends to block light emitted from the phosphorescent or fluorescent material. This problem also occurs if the shiny pigment is replaced with, for example, a metal powder pigment such as an aluminum powder pigment.

On the other hand, Japanese Unexamined Patent Application Publication No. 11-130992 discloses techniques for improving the visibility of films using a coating material containing a reflective agent made of glass particles or resin beads and a luminescent agent (fluorescent material). Examples of the techniques disclosed include (1) a monolayer luminescent film containing a reflective agent and a luminescent agent, (2) a bilayer luminescent film including a basecoat containing a luminescent agent and a topcoat containing a reflective agent, and (3) a bilayer luminescent film including a basecoat containing a reflective agent and a topcoat containing a luminescent agent.

Such films, however, exhibit almost no shininess. The techniques disclosed in Japanese Unexamined Patent Application Publication No. 11-130992 therefore have difficulty in improving the design of films.

SUMMARY OF THE INVENTION

An object of the present invention is to provide a product coated with a luminescent film having good visibility and design with a suitable combination of a phosphorescent or fluorescent material and a shiny pigment.

Another object of the present invention is to provide a luminescent-film-coated product that has good visibility and design and is suitable for, for example, warning/safety signs, position signs, and ornaments using the above luminescent film having good visibility and design.

A luminescent-film-coated product according to a first aspect of the present invention includes a substrate, a first layer that is formed on the substrate and is made of a transparent resin matrix containing a phosphorescent material and/or a fluorescent material, and a second layer that is formed on the first layer and is made of a transparent resin matrix containing a shiny pigment made of glass flakes coated with a high-refractive-index metal oxide.

A luminescent-film-coated product according to a second aspect of the present invention includes a substrate and a layer that is formed on the substrate and is made of a transparent resin matrix containing a phosphorescent material and/or a fluorescent material and a shiny pigment made of glass flakes coated with a high-refractive-index metal oxide.

A luminescent-film-coated product according to a third aspect of the present invention includes a substrate, a first layer that is formed on the substrate and is made of a transparent resin matrix containing a shiny pigment, and a second layer that is formed on the first layer and is made of a transparent resin matrix containing a phosphorescent material and/or a fluorescent material. The shiny pigment is made of glass flakes coated with one or more materials selected from the group consisting of silver, gold, nickel, and high-refractive-index metal oxides, and has a maximum reflectance in the visible light region of 30% or more.

According to the present invention, a suitable combination and arrangement of a phosphorescent material and/or a fluorescent material and a shiny pigment can produce a luminescent film that emits clear phosphorescent or fluorescent light and shows higher shininess. The use of the luminescent film therefore provides better design and visibility for products for various applications. When used for warning/safety signs or position signs, for example, the luminescent film can contribute to improvements in the safety of bicycle riding or car driving at nighttime.

DESCRIPTION OF THE PREFERRED EMBODIMENTS

[1] Luminescent Film Structure of Luminescent-Film-Coated Product According to First Aspect A luminescent-film-coated product according to the first aspect of the present invention has a multilayer luminescent film including a first layer that is formed on a substrate and is made of a transparent resin matrix containing a phosphorescent material and/or a fluorescent material and a second layer that is formed on the first layer and is made of a transparent resin matrix containing a shiny pigment made of glass flakes coated with a high-refractive-index metal oxide to allow the shiny pigment to enhance the shininess of the film without blocking light emitted from the phosphorescent material and/or the fluorescent material.

The top layer (second layer), which contains the shiny pigment, is composed of the transparent resin matrix containing the shiny pigment made of the glass flakes coated with the high-refractive-index metal oxide so as not to impair the shininess based on the light emission from the phosphorescent material and/or the fluorescent material contained in the bottom layer (first layer).

The material for the glass flakes of the shiny pigment, as a transparent base material for being coated with the high-refractive-index metal oxide, is not particularly limited, and is exemplified by materials mainly containing silicon dioxide, including C-glass, E-glass, alkali-resistant glass, high-strength glass, quartz glass, and A-glass. Among these materials, C-glass and E-glass are preferred because they can be processed into glass flakes having high transparency and excellent surface smoothness. That is, while glass flakes having excellent surface smoothness can be produced by, for example, drawing molten glass into a film, the glass flakes having the above compositions have particularly excellent surface smoothness and therefore do not attenuate the light emitted from the phosphorescent material and/or the fluorescent material.

The glass flakes preferably have an average particle diameter of 5 to 500 µm, an average thickness of 0.1 to 5 µm, and an average aspect ratio of 5 to 300, more preferably an average particle diameter of 8 to 300 µm, an average thickness of 0.2 to 2.5 µm, and an average aspect ratio of 8 to 200, still more preferably an average particle diameter of 8 to 50 µm, an average thickness of 0.5 to 2.0 µm, and an average aspect ratio of 8 to 50.

If the glass flakes have an average particle diameter below 5 µm, they aggregate readily and therefore cause difficulty in scattering visible light. If, on the other hand, the glass flakes have an average particle diameter above 500 µm, they are readily crushed when added as a filler. If the glass flakes have an average thickness below 0.1 µm, they are difficult to produce and have problems such as being readily crushed. If, on the other hand, the glass flakes have an average thickness above 5 µm, they produce irregularities on the luminescent film produced and therefore impair its appearance. If the glass flakes have an average aspect ratio below 5, they begin to show the properties as spherical particles and thus tend to cause a problem of aggregation. If, on the other hand, the glass flakes have an average aspect ratio above 300, they are readily crushed when added as a filler.

The average particle diameter of the glass flakes may be determined by simply averaging measurements of 50 glass flakes using a laser diffraction/scattering particle size analyzer, for example Microtrac® 2 (manufactured by Nikkiso Co., Ltd.). The average thickness of the glass flakes may be determined by simply averaging measurements of 50 glass flakes using an electron microscope. The average aspect ratio of the glass flakes may be determined by dividing the average particle diameter by the average thickness.

The glass flakes and the high-refractive-index metal oxide coatings formed on the glass flakes preferably have a difference in refractive index of 0.6 or more, more preferably 0.8 or more. At the interface between layers of different materials, generally, more reflection occurs with a larger difference in refractive index between the materials. If the difference in refractive index is 0.6 or more, the shininess can be enhanced not only by the light emission from the phosphorescent material and/or the fluorescent material, but also by the light reflection from the interfaces between the glass flakes and the metal oxide coatings. The refractive index of the glass flakes, which differs slightly according to the composition of the glass used, normally ranges from 1.50 to 1.60, for example about 1.54.

Similarly, the transparent resin matrix and the transparent high-refractive-index metal oxide coatings for the shiny pigment, preferably have a difference in refractive index of 0.6 or more, more preferably 0.8 or more.

Thus the transparent high-refractive-index metal oxide coatings for the shiny pigment may be made of, for example, at least one material selected from the group consisting of titanium dioxide ($TiO_2$, rutile, refractive index: 2.76; anatase, refractive index: 2.52), zirconium dioxide ($ZrO_2$, refractive index: 2.1 to 2.2), cerium oxide ($CeO_2$, refractive index: 2.2), zinc oxide (ZnO, refractive index: 1.9 to 2.1), dialuminum trioxide ($Al_2O_3$, refractive index: 1.6 to 1.8), diantimony trioxide ($Sb_2O_3$, refractive index: 2.0 to 2.3), tin oxide ($SnO_2$, refractive index: 2.0), and diiron trioxide ($Fe_2O_3$, refractive index: 2.9 to 3.2). Among these materials, a single thin film of titanium oxide, zirconium oxide, or cerium oxide or a thin film containing one or more of them in an amount of 50% or more by mass is preferred, and particularly, rutile titanium oxide, which has a refractive index of about 2.70, is preferred as the material for the transparent high-refractive-index metal oxide coatings.

The shiny pigment preferably has a visible light transmittance of 70% or more, more preferably 80% or more. If the shiny pigment has a visible light transmittance below 70%, it deteriorates the shininess based on the light emission from the phosphorescent material and/or the fluorescent material contained in the bottom layer. In addition, the shiny pigment preferably has a maximum reflectance in the visible light region of 30% or more, more preferably 50% or more. If the reflectance is below 30%, less reflection of the light emitted from the phosphorescent material and/or the fluorescent material contained in the bottom layer occurs on the shiny pigment, thus failing to enhance the shininess of the luminescent film. The methods used for measuring the visible light transmittance and reflectance of the shiny pigment will be described later.

The thickness of the transparent high-refractive-index metal oxide coatings in the shiny pigment is not particularly limited, though the coatings preferably have a thickness of 1 to 200 nm to achieve a visible light transmittance of 70% or more. If the thickness is below 1 nm, no reflection occurs at the interface between the glass flakes and the metal oxide coatings. If, on the other hand, the thickness exceeds 200 nm, the metal oxide grows its crystals which produce irregularities at the outer surfaces of the metal oxide coatings, resulting in larger scattering of transmitted light or reflected light. If, therefore, the thickness of the metal oxide coatings falls outside the above range, they impair the enhancement of the shininess by the light emission from the phosphorescent material and/or the fluorescent material contained in the bottom layer. Interference colors can be developed to provide better design by controlling the thickness of the high-refractive-index metal oxide coatings to 50 to 400 nm in terms of optical thickness (nd, wherein n is a refractive index and d is a physical thickness). Accordingly, more preferably, the high-refractive-index metal oxide coatings have a thickness of, for example, 20 to 160 nm if the material used is $TiO_2$.

Shiny pigments with high transparency are exemplified by Metashine® RRC series (MC5090RS, MC5090RY, MC5090RR, MC5090RB, MC5090RG, MC1080RS, MC1080RY, MC1080RR, MC1080RB, MC1080RG, MC1040RS, MC1040RY, MC1040RR, MC1040RB, MC1040RG, MC1020RS, MC1020RY, MC1020RR, MC1020RB, and MC1020RG), manufactured by Nippon Sheet Glass Co., Ltd. These pigments are produced by coating glass flakes having high surface smoothness with titanium dioxide. Table 1 shows the types of materials, sizes, and properties of the pigments. The shiny pigments shown in Table 1 have a visible light transmittance of 70% to 96% and a maximum reflectance in the visible light region of 30% to 45%. These pigments contain glass flakes with excellent surface smoothness, while natural or synthetic mica has a rough surface, such as a cleavage surface, thus having poor surface smoothness and showing an opaque appearance.

resin used include polypropylene resin; polycarbonate resin; chlorinated olefin resins such as chlorinated polyethylene and chlorinated polypropylene; thermoplastic polyester resin; thermoplastic fluorine resin; vinyl chloride resin; vinyl acetate resin; vinylidene chloride resin; vinyl resins produced by copolymerization of vinyl chloride, vinyl acetate, and vinylidene chloride; cellulose resin; and alkyd resin. These resins may be used alone or in combination. Among these resins, acrylic resin and polycarbonate resin are particularly preferred because they have high visible light transmittance.

The content of the shiny pigment in the top layer is preferably 0.1% to 30% by mass, more preferably 0.5% to 10% by mass, of the total amount, namely 100% by mass, of the transparent resin matrix and the shiny pigment to enhance the shininess of the luminescent film by the reflection of the shiny pigment without impairing the shininess of the bottom layer.

The second layer (top layer), which is composed of the transparent resin matrix containing the shiny pigment made of the glass flakes coated with the high-refractive-index metal oxide, preferably has a thickness of 5 to 150 μm, more preferably 10 to 100 μm. If the second layer has an excessively small thickness, it cannot achieve the enhancement of the shininess of the film. If, on the other hand, the second

TABLE 1

| Trade name | Glass composition | Thickness (μm) | Particle diameter (μm) | Coating thickness (nm) | Interference color Reflection color | Interference color Transmission color |
|---|---|---|---|---|---|---|
| MC5090RS | C-glass | 5 | 90 | 60 | Silver | Silver |
| MC5090RY | C-glass | 5 | 90 | 80 | Yellow | Blue |
| MC5090RR | C-glass | 5 | 90 | 100 | Red | Green |
| MC5090RB | C-glass | 5 | 90 | 120 | Blue | Yellow |
| MC5090RG | C-glass | 5 | 90 | 140 | Green | Red |
| MC1080RS | C-glass | 1.0 | 80 | 60 | Silver | Silver |
| MC1080RY | C-glass | 1.0 | 80 | 80 | Yellow | Blue |
| MC1080RR | C-glass | 1.0 | 80 | 100 | Red | Green |
| MC1080RB | C-glass | 1.0 | 80 | 120 | Blue | Yellow |
| MC1080RG | C-glass | 1.0 | 80 | 140 | Green | Red |
| MC1040RS | C-glass | 1.0 | 40 | 60 | Silver | Silver |
| MC1040RY | C-glass | 1.0 | 40 | 80 | Yellow | Blue |
| MC1040RR | C-glass | 1.0 | 40 | 100 | Red | Green |
| MC1040RB | C-glass | 1.0 | 40 | 120 | Blue | Yellow |
| MC1040RG | C-glass | 1.0 | 40 | 140 | Green | Red |
| MC1020RS | C-glass | 1.0 | 20 | 60 | Silver | Silver |
| MC1020RY | C-glass | 1.0 | 20 | 80 | Yellow | Blue |
| MC1020RR | C-glass | 1.0 | 20 | 100 | Red | Green |
| MC1020RB | C-glass | 1.0 | 20 | 120 | Blue | Yellow |
| MC1020RG | C-glass | 1.0 | 20 | 140 | Green | Red |

The resin used for the transparent resin matrix in which the shiny pigment is dispersed may be a transparent thermosetting or thermoplastic resin with a refractive index of 1.35 to 1.65. Examples of the thermosetting resin used include acrylic resin, silicone-modified acrylic resin, polyester resin, silicone-modified polyester resin, epoxy resin, fluorine resin, polyester-urethane curable resin, epoxy-polyester curable resin, acrylic-polyester resin, acrylic-urethane curable resin, acrylic-melamine curable resin, and polyester-melamine curable resin. These resins may be used alone or in combination. One or more curing agents may be added, such as polyisocyanates, amines, polyamides, polybasic acids, acid anhydrides, polysulfides, boron trifluoride, acid dihydrazides, and imidazole. Examples of the thermoplastic layer has an excessively large thickness, it exhibits considerable visible light absorption by the resin matrix.

The phosphorescent material and/or the fluorescent material contained in the bottom layer (first layer) may be, for example, a commercially available phosphorescent pigment, fluorescent pigment, or fluorescent dye. Examples of the phosphorescent material used include calcium sulfate phosphors (host crystal: CaS; activator: Bi); zinc sulfate phosphors (host crystal: ZnS; activator: Cu, "GSS" manufactured by Nemoto & Co., Ltd.); phosphors containing strontium aluminate or calcium aluminate, as a host crystal, and Eu, Dy, Nd, or the like, as an activator (LumiNova® G-300 series, BG-300 series, and V-300 series, manufactured by Nemoto & Co., Ltd.; "ULTRA GLOW series" NP-2810, NP-2820, and NP-2830, manufactured by Nichia Corporation; "R-bright" B and YG, manufactured by Lead Co., Ltd.; "Chemibright Powder" G-40-C, G-100-B, G-100-C, GB-80-B, and B-50-B, manufactured by Lumica Corporation); phosphors containing CaSrS, as a host crystal, and Bi, as an activator; and phosphors containing CaS, as a host crystal, and Eu or Tm, as an activator. On the other hand, examples of the fluorescent material used include Rhodamine B, Rhodamine 6G, Rhodamine S, Eosine, Basic yellow HG, Brilliant sulfoflavine FF, Thioflavine, and Fluorescein.

The size of the phosphorescent material and/or the fluorescent material is not particularly limited, though the average particle diameter is preferably 10 nm to 10 μm. If the phosphorescent material and/or the fluorescent material has an average particle diameter below 10 nm, it exhibits excessively poor durability and significantly decreased brightness. If, on the other hand, the phosphorescent material and/or the fluorescent material has an average particle diameter above 10 μm, it causes larger visible light scattering, thus producing a luminescent film with an opaque appearance and poor design. In addition, the phosphorescent material and/or the fluorescent material impairs the surface smoothness of the luminescent film if the luminescent film is thin.

The combination of the phosphorescent material and/or the fluorescent material contained in the bottom layer and the shiny pigment contained in the top layer is not particularly limited. Preferably, the phosphorescent material and/or the fluorescent material is used in combination with a shiny pigment with a color tone (reflection color tone) similar to the light emitted from the phosphorescent material and/or the fluorescent material, or a phosphorescent material and/or a fluorescent material that emits white light is used. In such cases, the light emitted from the phosphorescent material and/or the fluorescent material is clearly visible and can enhance the shininess of the luminescent film effectively.

The bottom layer may contain either or both of the phosphorescent material and the fluorescent material. The content of the phosphorescent material and/or the fluorescent material in the bottom layer (the total content if it contains both materials) is preferably 1% to 50% by mass, more preferably 1% to 20% by mass, of the total amount, namely 100% by mass, of the transparent resin matrix and the phosphorescent material and/or the fluorescent material in consideration of the enhancement of the shininess and coating strength.

The above description of the transparent resin matrix for the top layer is also applied to the transparent resin matrix for the bottom layer. The same transparent resin matrix as that for the top layer is preferably used for the bottom layer so as not to impair transparency.

The first layer (bottom layer), which is composed of the transparent resin matrix containing the phosphorescent material and/or the fluorescent material, preferably has a thickness of 10 to 200 μm. If the bottom layer has an excessively large thickness, it exhibits considerable visible light absorption by the resin matrix. If, on the other hand, the bottom layer has an excessively small thickness, it emits low light and therefore cannot provide better design.

The bottom layer (first layer) and the top layer (second layer) preferably have a total thickness of 15 to 250 μm. If the luminescent film has a total thickness above 250 μm, it exhibits considerable visible light absorption by the resin matrix.

[2] Luminescent Film Structure of Luminescent-Film-Coated Product According to Second Aspect A luminescent-film-coated product according to the second aspect of the present invention has a luminescent film that is formed on a substrate and is made of a transparent resin matrix containing a phosphorescent material and/or a fluorescent material and a shiny pigment made of glass flakes coated with a high-refractive-index metal oxide to allow the shiny pigment to enhance the shininess of the film without blocking light emitted from the phosphorescent material and/or the fluorescent material.

The above description of the luminescent film structure according to the first aspect may be applied to the description of the shiny pigment, the phosphorescent material, the fluorescent material, and the transparent resin matrix according to the second aspect.

The content of the phosphorescent material and/or the fluorescent material in the film (the total content if it contains both materials) is preferably 1% to 50% by mass of the total amount, namely 100% by mass, of the transparent resin matrix, the phosphorescent material and/or the fluorescent material, and the shiny pigment. On the other hand, the content of the shiny pigment in the film is preferably 0.1% to 30% by mass. The total content of the phosphorescent material and/or the fluorescent material and the shiny pigment is preferably 1.1% to 50% by mass.

An excessively high content of the phosphorescent material and/or the fluorescent material in the film results in a relative decrease in the content of the shiny pigment, while an excessively high content of the shiny pigment in the film results in a relative decrease in the content of the phosphorescent material and/or the fluorescent material. In either case, the resultant luminescent film has decreased shininess.

The luminescent film, which contains the phosphorescent material and/or the fluorescent material and the shiny pigment, preferably has a thickness of 15 to 250 μm for the same reason as the luminescent film according to the first aspect.

[3] Luminescent Film Structure of Luminescent-Film-Coated Product According to Third Aspect A luminescent-film-coated product according to the third aspect of the present invention has a multilayer luminescent film including a first layer that is formed on a substrate and is made of a transparent resin matrix containing a shiny pigment and a second layer that is formed on the first layer and is made of a transparent resin matrix containing a phosphorescent material and/or a fluorescent material to allow the shiny pigment to enhance the shininess of the film without blocking light emitted from the phosphorescent material and/or the fluorescent material. The shiny pigment is made of glass flakes coated with one or more materials selected from the group consisting of silver, gold, nickel, and high-refractive-index metal oxides, and has a maximum reflectance in the visible light region of 30% or more.

In the luminescent film structure according to the third aspect, the shiny pigment, which is contained in the bottom layer, has a maximum reflectance in the visible light region of 30% or more. The shiny pigment used is that used for the top layer in the luminescent film structure according to the first aspect or a shiny pigment made of glass flakes having monolayer coatings of silver, gold, or nickel or multilayer coatings of two or more of them. The shiny pigment preferably has a maximum reflectance in the visible light region of 50% or more.

A preferred example of the shiny pigment used is Metashine® RRC series above (manufactured by Nippon Sheet Glass Co., Ltd.). Alternatively, a shiny pigment made of glass flakes plated with silver, gold, or nickel may be used. The glass flakes used may be the same as those for the shiny pigment according to the first aspect. The silver, gold, or nickel coatings preferably have a thickness of 30 to 200 nm.

If the coatings have a thickness below 30 nm, the shiny pigment decreases in reflectance, thus failing to enhance the shininess of the bottom layer. If, on the other hand, the coatings have a thickness above 200 nm, they peel easily off the base material. In addition, the production of silver or gold coatings having such a large thickness involves a high, impractical cost because a large amount of expensive material such as silver and gold is used. The shiny pigment used is specifically exemplified by the following materials:

Silver-coated glass flakes
  Glass composition: C-glass or E-glass
  Flake thickness: 0.5 to 5 µm
  Flake particle diameter: 10 to 500 µm
  Aspect ratio: 8 to 100
  Silver coating thickness: 50 nm
  Reflection color: silver
  Visible light transmittance: 0%
  Maximum reflectance in visible light region (at about 400 nm): 60%
  Metashine® RPS series MCK500PS, MC5480PS, MC5230PS, MC5150PS, MC5140PS, MC5090PS, MC5030PS, MC2080PS, ME2040PS, ME2025PS, MEG020PS, and MEG040PS (manufactured by Nippon Sheet Glass Co., Ltd.)

Gold/silver-coated glass flakes
  Glass composition: C-glass or E-glass
  Flake thickness: 1 µm
  Flake particle diameter: 20 to 80 µm
  Aspect ratio: 20 to 80
  Silver basecoat thickness: 50 nm
  Gold topcoat thickness: 20 nm
  Total thickness: 70 nm
  Reflection color: gold
  Visible light transmittance: 0%
  Maximum reflectance in visible light region (at about 400 nm): 60%
  Metashine® RGP series MC2080GP, MC2060GP, ME2040GP, and ME2025GP (manufactured by Nippon Sheet Glass Co., Ltd.)

Nickel-coated glass flakes
  Glass composition: C-glass
  Flake thickness: 5 µm
  Flake particle diameter: 30 to 480 µm
  Aspect ratio: 18 to 96
  Nickel coating thickness: 150 nm
  Reflection color: silver
  Visible light transmittance: 0%
  Maximum reflectance in visible light region (at about 800 nm): 50%
  Metashine® R nickel series MC5480NS, MC5230NS, MC5150NS, MC5090NS, and MC5030NS (manufactured by Nippon Sheet Glass Co., Ltd.)

The above description of the luminescent film structure according to the first aspect may be applied to the description of the phosphorescent material and the fluorescent material for the second layer and the transparent resin matrix for the first and second layers according to the third aspect.

The content of the phosphorescent material and/or the fluorescent material in the top layer (second layer) is preferably 1% to 50% by mass, more preferably 1% to 20% by mass, of the total amount, namely 100% by mass, of the transparent resin matrix and the phosphorescent material and/or the fluorescent material. If the content of the phosphorescent material and/or the fluorescent material is below 1% by mass, the luminescent film exhibits low emission intensity and is therefore difficult to recognize at nighttime when used for signs. If, on the other hand, the content is above 50% by mass, the luminescent film loses its surface smoothness, thus impairing the design of the film and the shininess due to the shiny pigment contained in the bottom layer.

The content of the shiny pigment in the bottom layer is preferably 0.1% to 30% by mass, more preferably 1% to 20% by mass, of the total amount, namely 100% by mass, of the transparent resin matrix and the shiny pigment. If the content of the shiny pigment in this layer is below 0.1% by mass, the film lacks shininess. If, on the other hand, the content is above 30% by mass, the film produces irregularities on its surface which impair the design of the film.

The top layer, which contains the phosphorescent material and/or the fluorescent material, preferably has a thickness of 10 to 200 µm for the same reason as the bottom layer of the luminescent film according to the first aspect. Similarly, the bottom layer, which contains the shiny pigment, preferably has a thickness of 5 to 150 µm. The bottom layer (first layer) and the top layer (second layer) preferably have a total thickness of 15 to 250 µm for the same reason as the luminescent film according to the first aspect.

[4] Method for Forming Luminescent Film and Basecoat Film or Topcoat Film

The above luminescent films are used as coatings for various products. A basecoat film may be provided between the luminescent films and the products, or the luminescent films may be further coated with a highly transparent resin. The products may be directly coated with the luminescent films. Alternatively, the luminescent films may be bonded to the products after the films are formed on nonstick substrates and are peeled off the substrates, or resin films coated with the luminescent films may be bonded to the products.

The luminescent films may be formed by any known method, such as spraying and dipping.

[5] Applications of Luminescent-Film-Coated Products

The luminescent-film-coated products according to the present invention may be used for general-purpose applications, including warning/safety signs, position signs, and ornaments. Examples of the warning/safety signs include splash guards and marking films for bicycles, fenders and body lines for automobiles, devices and signs associated with evacuation, umbrellas, signs in subways and undergrounds, notes of caution, illustrations, helmets, non-slip stair treads, facility guides in hospitals, hats, sneakers, babywear, work clothes, and handrails. Examples of the position signs include electric switches, remote controls, dial plates for radios, outlets, keys and keyholes, flashlights, stairs, road signs, survival kits, fire extinguishers, fire alarms, indicators, and life preservers. Examples of the ornaments include tiles, floors, baseboards, luminous artificial flowers, labels, stickers, beads, wallpaper, door curtains, curtains, tablecloths, fibers, fabrics, ties, brooches, rings, bracelets, necklaces, earrings, pierced earrings, public art, monuments, spot art on roads and walls, pottery, paintings, signboards, printed matter, stage settings, nail seals, calendars, posters, nameplates, candles, angling gear, fishing gear, toys, key rings, coasters, clocks, lighting fixture products (such as lampshades), buttons, bags, and various novelties.

[6] Examples

The present invention will now be specifically described with examples, though the invention is not particularly limited to the examples within the scope of the invention.

Shiny pigments, such as coated glass flakes, prepared in the examples and comparative examples were evaluated for visible light transmittance and visible light reflectance according to the following methods.

[Evaluation Method for Visible Light Transmittance]

Each shiny pigment was added to a vinyl chloride resin coating material (Vinylose Clear GA00011, manufactured by Dai Nippon Toryo Co., Ltd.; solvent: mixture of toluene, xylene, and butyl acetate; solid content: 50% by weight; resin refractive index: 1.54) such that the content of the shiny pigment in the resin was 10% by weight. This mixture was well stirred, was applied to a substrate, and was dried and peeled off the substrate to form a film having a thickness of 100 µm. The light transmittance of the film was measured according to JIS K 7105:1981 5.5.2 with standard light source A at a wavelength of 550 nm, at which the human eye has the peak sensitivity to light, using a spectrophotometer (U-3100, manufactured by Hitachi High-Technologies Corporation). In addition, the light transmittance of a vinyl chloride resin film with a thickness of 100 µm which contained no shiny pigment was measured in advance to calibrate data on the individual films containing the shiny pigments such that the light transmittance of the film containing no shiny pigment was 100%.

[Evaluation Method for Visible Light Reflectance]

First, 1 g of each shiny pigment was mixed to 49 g (solid content weight) of acrylic resin (manufactured by Nippon Paint Co., Ltd., Acryl Autoclear Super, resin refractive index: 1.52) with vigorous stirring using a paint shaker. This mixture was then applied to a hiding chart using a 9-mil applicator to form an acrylic resin layer containing the shiny pigment and having a thickness of 100 µm. Optical measurements were made on the portions of the layer above black portions of the hiding chart using an integrating sphere (10° reflection) of the above spectrophotometer to determine reflectance at a light wavelength at which the maximum reflectance was achieved in the visible light region as the maximum reflectance (%) in the visible light region. In addition, an acrylic resin containing no shiny pigment was applied to a hiding chart using a 9-mil applicator to form an acrylic resin layer having a thickness of 100 µm in advance. Optical measurements were also made on the portions of the layer above black portions of the hiding chart using the integrating sphere (10° reflection) of the above spectrophotometer to calibrate data on the individual films containing the shiny pigments such that the maximum visible light reflectance of the film containing no shiny pigment was 0%.

The phosphorescent material, fluorescent material, shiny pigments, other pigments, and transparent resin matrix used are as follows:

[Phosphorescent Material]
"G-100-C (green)" ($SrAl_2O_4$, Eu, Dy, fine particles, average particle diameter: 10 nm), manufactured by Lumica Corporation

[Fluorescent Material]
Fluorescent dye "Rhodamine B" (average particle diameter: molecular size)

[Shiny Pigment]
$TiO_2$-coated glass flakes A: Metashine® MC5090RS, manufactured by Nippon Sheet Glass Co., Ltd.
  Glass composition: C-glass
  Glass refractive index: 1.54
  Flake thickness: 5 µm
  Flake particle diameter: 90 µm
  $TiO_2$ (rutile) coating thickness: 60 nm
  $TiO_2$ coating refractive index: 2.68
  Interference color (reflection): silver
  Interference color (transmission): silver
  Visible light transmittance: 80%
  Maximum reflectance in visible light region (at about 400 nm): 38%
$TiO_2$-coated glass flakes B: Metashine® MC5090RG, manufactured by Nippon Sheet Glass Co., Ltd.
  Glass composition: C-glass
  Flake thickness: 5 µm
  Flake particle diameter: 90 µm
  $TiO_2$ (rutile) coating thickness: 140 nm
  Interference color (reflection): green.
  Interference color (transmission): red
  Visible light transmittance: 93%
  Maximum reflectance in visible light region (at about 490 nm): 38%
$TiO_2$-coated glass flakes C: Metashine® MC5090RR, manufactured by Nippon Sheet Glass Co., Ltd.
  Glass composition: C-glass
  Flake thickness: 5 µm
  Flake particle diameter: 90 µm
  $TiO_2$ (rutile) coating thickness: 100 nm
  Interference color (reflection): red
  Interference color (transmission): green
  Visible light transmittance: 93%
  Maximum reflectance in visible light region (at about 800 nm): 34%
Silver-coated glass flakes: Metashine® MC5090PS, manufactured by Nippon Sheet Glass Co., Ltd.
  Glass composition: C-glass
  Flake thickness: 5 µm
  Flake particle diameter: 90 µm
  Silver coating thickness: 50 nm
  Reflection color: silver
  Visible light transmittance: 0%
  Maximum reflectance in visible light region (at about 400 nm): 60%
Nickel-coated glass flakes A: Metashine® MC5090NS, manufactured by Nippon Sheet Glass Co., Ltd.
  Glass composition: C-glass
  Flake thickness: 5 µm
  Flake particle diameter: 90 µm
  Nickel coating thickness: 150 nm
  Reflection color: silver
  Visible light transmittance: 0%
  Maximum reflectance in visible light region (at about 800 nm): 52%
Nickel-coated glass flakes B: Metashine® MC5090NB, manufactured by Nippon Sheet Glass Co., Ltd.
  Glass composition: C-glass
  Flake thickness: 5 µm
  Flake particle diameter: 90 µm
  Nickel coating thickness: 20 nm
  Reflection color: silver
  Visible light transmittance: 5%
  Maximum reflectance in visible light region (at about 800 nm): 15%

[Other Pigments]
Glass particles
  Glass composition: C-glass
  Average particle diameter: 20 µm
  Visible light transmittance: 91%
  Maximum reflectance in visible light region (at about 500 nm): 5%
Pearl mica
  Mica thickness: 0.4 µm
  Average particle diameter: 20 µm
  $TiO_2$ coating thickness: 60 nm
  Interference color (reflection): silver Visible light transmittance: 68%

Maximum reflectance in visible light region (at about 400 nm): 35%

[Transparent Resin for Matrix]

Acrylic resin: "Acryl Autoclear Super" (resin refractive index: 1.52), manufactured by Nippon Paint Co., Ltd.

EXAMPLES ACCORDING TO FIRST ASPECT

Example 1

First, 1 g of the phosphorescent material G-100-C was mixed to 49 g (solid content weight) of the acrylic resin with vigorous stirring using a paint shaker. This mixture was then applied to a hiding chart having white and black portions using a 9-mil applicator to form a bottom layer containing the phosphorescent material. Similarly, 1 g of the $TiO_2$-coated glass flakes A, as a shiny pigment, was mixed to 49 g (solid content weight) of the acrylic resin with vigorous stirring using a paint shaker. This mixture was then applied to the bottom layer using an 18-mil applicator to form a layer containing the shiny pigment.

This multilayer film was completely dried by leaving it at normal temperature to obtain a luminescent-film-coated product having a film including a phosphorescent-material-containing layer, with a thickness of 100 μm, formed on the hiding chart and a shiny-pigment-containing layer, with a thickness of 100 μm, formed on the phosphorescent-material-containing layer.

The design of the luminescent-film-coated product was evaluated by a sensory test with five examiners. In this sensory test, the film was exposed to daytime sunlight and was then taken to a darkroom to evaluate whether the film had shininess and whether the color of the light was clear. Table 2 shows the comprehensive evaluation results by the five examiners. These evaluations were determined by visual inspection with reference to a film of Comparative Example 1.

Example 2

A film was formed to obtain a luminescent-film-coated product in the same manner as in Example 1 except that the $TiO_2$-coated glass flakes B were used as a shiny pigment instead of the $TiO_2$-coated glass flakes A. The phosphorescent-material-containing layer and shiny-pigment-containing layer of the film had the same thickness as those in Example 1, and were formed in that order. This luminescent-film-coated product was evaluated in the same manner as in Example 1. The evaluation results are shown in Table 2.

Example 3

A film was formed to obtain a luminescent-film-coated product in the same manner as in Example 1 except that 0.1 g of the fluorescent dye Rhodamine B was used instead of 1 g of the fluorescent material used in Example 1, and that the $TiO_2$-coated glass flakes C were used as a shiny pigment instead of the $TiO_2$-coated glass flakes A. The phosphorescent-material-containing layer and shiny-pigment-containing layer of the film had the same thickness as those in Example 1, and were formed in that order. This luminescent-film-coated product was evaluated in the same manner as in Example 1. The evaluation results are shown in Table 2.

EXAMPLES ACCORDING TO SECOND ASPECT

Example 4

First, 1 g of the $TiO_2$-coated glass flakes B, as a shiny pigment, and 1 g of the phosphorescent material G-100-C were mixed to 96 g of the acrylic resin with vigorous stirring using a paint shaker. This mixture was then applied to a hiding chart using an 18-mil applicator, and was completely dried at normal temperature to obtain a luminescent-film-coated product having a film that had a thickness of 200 μm and contained the phosphorescent material and the shiny pigment. This luminescent-film-coated product was evaluated in the same manner as in Example 1. The evaluation results are shown in Table 2.

EXAMPLES ACCORDING TO THIRD ASPECT

Example 5

First, 1 g of the $TiO_2$-coated glass flakes A, as a shiny pigment, was mixed to 49 g (solid content weight) of the acrylic resin with vigorous stirring using a paint shaker. This mixture was then applied to a hiding chart using a 9-mil applicator to form a bottom layer containing the shiny pigment. Subsequently, 1 g of the phosphorescent material G-100-C was mixed to 49 g (solid content weight) of the acrylic resin with vigorous stirring using a paint shaker. This mixture was then applied to the bottom layer using an 18-mil applicator to form a layer containing the phosphorescent material. This multilayer film was completely dried by leaving it at normal temperature to obtain a luminescent-film-coated product having a film including a shiny-pigment-containing layer, with a thickness of 100 μm, formed on the hiding chart and a phosphorescent-material-containing layer, with a thickness of 100 μm, formed on the shiny-pigment-containing layer. This luminescent-film-coated product was evaluated in the same manner as in Example 1. The evaluation results are shown in Table 2.

Example 6

A film was formed to obtain a luminescent-film-coated product in the same manner as in Example 5 except that the silver-coated glass flakes were used as a shiny pigment instead of the $TiO_2$-coated glass flakes A. The shiny-pigment-containing layer and phosphorescent-material-containing layer of the film had the same thickness as those in Example 5, and were formed in that order. This luminescent-film-coated product was evaluated in the same manner as in Example 1. The evaluation results are shown in Table 2.

Example 7

A film was formed to obtain a luminescent-film-coated product in the same manner as in Example 5 except that the nickel-coated glass flakes A were used as a shiny pigment instead of the $TiO_2$-coated glass flakes A. The shiny-pigment-containing layer and phosphorescent-material-containing layer of the film had the same thickness as those in Example 5, and were formed in that order. This luminescent-film-coated product was evaluated in the same manner as in Example 1. The evaluation results are shown in Table 2.

COMPARATIVE EXAMPLES

Comparative Example 1

A film was formed to obtain a luminescent-film-coated product in the same manner as in Example 1 except that the nickel-coated glass flakes A were used as a shiny pigment instead of the TiO$_2$-coated glass flakes A. This luminescent-film-coated product was evaluated in the same manner as in Example 1. The evaluation results are shown in Table 2.

Comparative Example 2

A film was formed to obtain a luminescent-film-coated product in the same manner as in Example 3 except that the nickel-coated glass flakes A were used as a shiny pigment instead of the TiO$_2$-coated glass flakes C. This luminescent-film-coated product was evaluated in the same manner as in Example 1. The evaluation results are shown in Table 2.

Comparative Example 3

A film was formed to obtain a luminescent-film-coated product in the same manner as in Example 4 except that the nickel-coated glass flakes A were used as a shiny pigment instead of the TiO$_2$-coated glass flakes B. This luminescent-film-coated product was evaluated in the same manner as in Example 1. The evaluation results are shown in Table 2.

Comparative Example 4

A film was formed to obtain a luminescent-film-coated product in the same manner as in Example 5 except that the nickel-coated glass flakes B were used as a shiny pigment instead of the TiO$_2$-coated glass flakes A. This luminescent-film-coated product was evaluated in the same manner as in Example 1. The evaluation results are shown in Table 2.

Comparative Example 5

A film was formed to obtain a luminescent-film-coated product in the same manner as in Example 1 except that the glass particles were used instead of the shiny pigment. This luminescent-film-coated product was evaluated in the same manner as in Example 1. The evaluation results are shown in Table 2.

Comparative Example 6

A film was formed to obtain a luminescent-film-coated product in the same manner as in Example 4 except that the glass particles were used instead of the shiny pigment. This luminescent-film-coated product was evaluated in the same manner as in Example 1. The evaluation results are shown in Table 2.

Comparative Example 7

A film was formed to obtain a luminescent-film-coated product in the same manner as in Example 5 except that the glass particles were used instead of the shiny pigment. This luminescent-film-coated product was evaluated in the same manner as in Example 1. The evaluation results are shown in Table 2.

Comparative Example 8

A film was formed to obtain a luminescent-film-coated product in the same manner as in Example 1 except that the pearl mica was used instead of the shiny pigment. This luminescent-film-coated product was evaluated in the same manner as in Example 1. The evaluation results are shown in Table 2.

Table 3 lists the types of phosphorescent material and fluorescent material for the individual films of Examples 1 to 7 and Comparative Examples 1 to 8, and the types of powders, types and thicknesses of coatings, and optical characteristics of the shiny pigments for the individual films.

TABLE 2

| | Sensory evaluation results |
|---|---|
| Example 1 | Phosphorescent light emitted from the overall film could be clearly recognized. The film had shininess and excelled in design on the whole. |
| Example 2 Example 3 | Phosphorescent light (Example 2) and fluorescent light (Example 3) emitted from the overall films could be clearly recognized. The films had shininess and excelled in design on the whole. The phosphorescent light and fluorescent light were clear and sparkling. The light looked clearer than that in Example 1 because the phosphorescent and fluorescent materials and shiny pigments used had similar color tones. |
| Example 4 | Phosphorescent light emitted from the overall film could be clearly recognized. The film had shininess and excelled in design on the whole. |
| Example 5 Example 6 Example 7 | Phosphorescent light emitted from the overall films could be clearly recognized. The films had shininess and excelled in design on the whole. The phosphorescent light was stronger and could therefore be more clearly recognized than that in Example 1 though the films had slightly lower shininess than that in Example 1. |
| Comparative Example 1 Comparative Example 2 | Phosphorescent light and fluorescent light were difficult to recognize, and the films lacked shininess because the shiny pigment used was opaque. |
| Comparative Example 3 | Slight phosphorescent light could be recognized, though it was very low. |
| Comparative Example 4 | Almost no phosphorescent light could be recognized. |
| Comparative Example 5 | Phosphorescent light emitted from the overall film could be recognized, though the film had no shininess and was poor in design. |

TABLE 2-continued

Sensory evaluation results

| | |
|---|---|
| Comparative Example 6 | Phosphorescent light emitted from the overall film could be recognized, though the film had no shininess and was poor in design. |
| Comparative Example 7 | Phosphorescent light emitted from the overall film could be recognized, though the film had no shininess and was poor in design. |
| Comparative Example 8 | Phosphorescent light emitted from the overall film could be less clearly recognized than that in Examples. In spite of shininess, the film had an opaque appearance and was poor in design. |

TABLE 3

| | | First layer (bottom layer) | | | | | |
|---|---|---|---|---|---|---|---|
| | | Phosphorescent material and fluorescent material | Shiniy pigment | | | | |
| | | | Type of powder | Coating | | Visible light transmittance (%) | Maximum visible light reflectance (%) | Reflection color tone |
| | | | | Type | Thickness (nm) | | | |
| Example | 1 | G-100-C | — | — | — | — | — | — |
| | 2 | G-100-C | — | — | — | — | — | — |
| | 3 | Rhodamine B | — | — | — | — | — | — |
| | 4 | G-100-C | Glass flake | TiO$_2$ | 140 | 93 | 38 | Green |
| | 5 | — | Glass flake | TiO$_2$ | 60 | 80 | 38 | Silver |
| | 6 | — | Glass flake | Silver | 50 | 0 | 60 | Silver |
| | 7 | — | Glass flake | Nickel | 150 | 0 | 52 | Silver |
| Conparative Example | 1 | G-100-C | — | — | — | — | — | — |
| | 2 | Rhodamine B | — | — | — | — | — | — |
| | 3 | G-100-C | Glass flake | Nickel | 150 | 0 | 52 | Silver |
| | 4 | — | Glass flake | Nickel | 20 | 5 | 15 | Silver |
| | 5 | G-100-C | — | — | — | — | — | — |
| | 6 | G-100-C | Glass particle | — | — | 91 | 5 | — |
| | 7 | — | Glass particle | — | — | 91 | 5 | — |
| | 8 | G-100-C | — | — | — | — | — | — |

| | | Second layer (top layer) | | | | | |
|---|---|---|---|---|---|---|---|
| | | Phosphorescent material | Shiniy pigment | | | | |
| | | | Type of powder | Coating | | Visible light transmittance (%) | Maximum visible light reflectance (%) | Reflection color tone |
| | | | | Type | Thickness (nm) | | | |
| Example | 1 | — | Glass flake | TiO$_2$ | 60 | 80 | 38 | Silver |
| | 2 | — | Glass flake | TiO$_2$ | 140 | 93 | 38 | Green |
| | 3 | — | Glass flake | TiO$_2$ | 100 | 93 | 34 | Red |
| | 4 | — | — | — | — | — | — | — |
| | 5 | G-100-C | — | — | — | — | — | — |
| | 6 | G-100-C | — | — | — | — | — | — |
| | 7 | G-100-C | — | — | — | — | — | — |
| Conparative Example | 1 | — | Glass flake | Nickel | 150 | 0 | 52 | Silver |
| | 2 | — | Glass flake | Nickel | 150 | 0 | 52 | Silver |
| | 3 | — | — | — | — | — | — | — |
| | 4 | G-100-C | — | — | — | — | — | — |
| | 5 | — | Glass particle | — | — | 91 | 5 | — |

TABLE 3-continued

| | | | | | | | |
|---|---|---|---|---|---|---|---|
| 6 | — | | | | | | |
| 7 | G-100-C | | | | | | |
| 8 | — | Mica | TiO$_2$ | 60 | 68 | 35 | Silver |

The above results are summarized as follows.

Comparisons between Examples 1 and 2 and Comparative Example 1 and between Example 3 and Comparative Example 2 show that, in spite of the same film structure, a luminescent film containing a light-shielding shiny pigment cannot recognizably provide light emitted from a phosphorescent material or fluorescent material contained in the bottom layer. According to the comparisons, on the other hand, a luminescent film containing a highly transparent shiny pigment can clearly recognizably provide light emitted from the bottom layer.

A comparison between Example 4 and Comparative Example 3 shows that a luminescent film containing a mixture of a phosphorescent material and a light-shielding shiny pigment emits very low phosphorescent light and therefore has low visibility. According to the comparison, on the other hand, a luminescent film containing a mixture of a phosphorescent material and a highly transparent shiny pigment can clearly recognizably provide light emitted from the phosphorescent material because of the high transparency.

Comparisons between Examples 5, 6, and 7 and Comparative Example 3 show that phosphorescent light emitted from a phosphorescent material can be emphasized by forming a layer containing the phosphorescent material on a layer containing a shiny pigment having high maximum reflectance, rather than mixing the shiny pigment and the phosphorescent material, so that the light emission can be clearly recognized.

Comparisons between Examples 5, 6, and 7 and Comparative Example 4 show that, in spite of the same film structure, a luminescent film containing a shiny pigment having low maximum reflectance cannot recognizably provide phosphorescent light emitted from a phosphorescent material contained in the top layer. According to the comparisons, on the other hand, a luminescent film containing a shiny pigment having high maximum reflectance can clearly recognizably provide phosphorescent light emitted from a phosphorescent material.

Comparisons between Example 1 and Comparative Example 5, between Example 4 and Comparative Example 6, and between Example 5 and Comparative Example 7 show that, in spite of the same film structures and the use of highly transparent glass particles, a luminescent film containing a shiny pigment having low reflectance has no shininess and is therefore poor in design, though recognizably providing phosphorescent light emitted from a phosphorescent material. According to the comparisons, on the other hand, a luminescent film containing a shiny pigment having high maximum reflectance not only can clearly recognizably provide phosphorescent light emitted from a phosphorescent material, but also has shininess and excels in design.

A comparison between Example 1 and Comparative Example 8 shows that, in spite of the same film structure, a luminescent film containing pearl mica, which has high reflectance, has slightly lower transmittance and looks opaque because of poor surface smoothness. The film therefore has an opaque appearance and is poor in design, though the film can recognizably provide phosphorescent light emitted from a phosphorescent material and has shininess. According to the comparison, on the other hand, a luminescent film containing glass flakes, which have good surface smoothness, not only can clearly recognizably provide phosphorescent light emitted from a phosphorescent material, but also has shininess and excels in design.

What is claimed is:

1. A luminescent-film-coated product comprising:
    a substrate;
    a first layer formed on the substrate, comprising a transparent resin matrix containing at least one of a phosphorescent material and a fluorescent material; and
    a second layer formed on the first layer, comprising a transparent resin matrix containing a shiny pigment comprising glass flakes coated with a high-refractive-index metal oxide having a coating thickness of 1 to 200 nm.

2. The luminescent-film-coated product according to claim 1, wherein the shiny pigment has a visible light transmittance of 70% or more.

3. The luminescent-film-coated product according to claim 1, wherein the shiny pigment has a maximum reflectance in the visible light region between 30% and 45%.

4. The luminescent-film-coated product according to claim 1, wherein the high-refractive-index metal oxide is TiO$_2$, and the thickness is that which enables the coating to show interference colors.

5. The luminescent-film-coated product according to claim 4, wherein the thickness of the TiO$_2$ coating ranges from 20 to 160 nm.

6. The luminescent-film-coated product according to claim 1, wherein the glass flakes have an average particle diameter of 5 to 500 μm, an average thickness of 0.1 to 5 μm, and an average aspect ratio of 5 to 300.

7. The luminescent-film-coated product according to claim 1, wherein the glass composition of the glass flakes is C-glass or E-glass.

8. The luminescent-film-coated product according to claim 1, wherein the first layer transparent resin matrix and the second layer transparent resin matrix comprise acrylic resin or polycarbonate resin.

9. The luminescent-film-coated product according to claim 1, wherein the content of the at least one the phosphorescent material and the fluorescent material in the first layer is 1% to 50% by mass of the total amount the transparent resin matrix and the at least one of the phosphorescent material and the fluorescent material.

10. The luminescent-film-coated product according to claim 1, wherein the first layer has a thickness of 10 to 200 μm.

11. The luminescent-film-coated product according to claim 1, wherein the content of the shiny pigment in the second layer is 0.1% to 30% by mass of the total amount of the transparent resin matrix and the shiny pigment.

12. The luminescent-film-coated product according to claim 1, wherein the second layer has a thickness of 5 to 150 μm.

13. The luminescent-film-coated product according to claim 1, wherein the first and second layers have a total thickness of 15 to 250 µm.

14. The luminescent-film-coated product according to claim 1, which is a sign.

15. The luminescent-film-coated product according to claim 1, which is a position sign.

16. The luminescent-film-coated product according to claim 1, which is an ornament.

17. A luminescent-film-coated product comprising:
a substrate; and
a layer formed on the substrate, comprising a transparent resin matrix containing at least one of a phosphorescent material and a fluorescent material, and a shiny pigment comprising glass flakes coated with a high-refractive-index metal oxide having a coating thickness of 1 to 200 nm; and
wherein the content of the at least one of the phosphorescent material and the fluorescent material in the layer is 1% to 50% by mass of the total amount of the transparent resin matrix, the shiny pigment, and the at least one of the phosphorescent material and the fluorescent material.

18. The luminescent-film-coated product according to claim 17, wherein the shiny pigment has a visible light transmittance of 70% or more.

19. The luminescent-film-coated product according to claim 17, wherein the shiny pigment has a maximum reflectance in the visible light region between 30% and 45%.

20. The luminescent-film-coated product according to claim 17, wherein the high-refractive-index metal oxide is $TiO_2$, and the thickness is that which enables the coating to show interference colors.

21. The luminescent-film-coated product according to claim 20, wherein the thickness of the $TiO_2$ coating ranges from 20 to 160 nm.

22. The luminescent-film-coated product according to claim 17, wherein the glass flakes have an average particle diameter of 5 to 500 µm, an average thickness of 0.1 to 5 µm, and an average aspect ratio of 5 to 300.

23. The luminescent-film-coated product according to claim 17, wherein the glass composition of the glass flakes is C-glass or E-glass.

24. The luminescent-film-coated product according to claim 17, wherein the transparent resin matrix comprises acrylic resin or polycarbonate resin.

25. The luminescent-film-coated product according to claim 17, wherein the content of the shiny pigment in the layer is 0.1% to 30% by mass of the total amount of the transparent resin matrix, the shiny pigment, and the at least one of the phosphorescent material and the fluorescent material.

26. The luminescent-film-coated product according to claim 17, wherein the total content of the at least one of the phosphorescent material and the fluorescent material and the shiny pigment in the layer is 1.1% to 50% by mass of the total amount of the transparent resin matrix, the shiny pigment, and the at least one of the phosphorescent material and the fluorescent material.

27. The luminescent-film-coated product according to claim 17, wherein the layer has a thickness of 15 to 250 µm.

28. The luminescent-film-coated product according to claim 17, which is a sign.

29. The luminescent-film-coated product according to claim 17, which is a position sign.

30. The luminescent-film-coated product according to claim 17, which is an ornament.

31. A luminescent-film-coated product comprising:
a substrate;
a first layer formed on the substrate, comprising a transparent resin matrix containing a shiny pigment comprising glass flakes coated with one or more materials selected from the group consisting of silver, gold, nickel, and high-refractive-index metal oxides, the high-refractive-index metal oxides having a coating thickness of 1 to 200 nm, and the shiny pigment having a maximum reflectance in the visible light region between 30% and 45%; and
a second layer formed on the first layer, comprising a transparent resin matrix containing at least one of a phosphorescent material and a fluorescent material.

32. The luminescent-film-coated product according to claim 31, wherein the high-refractive-index metal oxide is $TiO_2$, and the thickness is that which enables the coating to show interference colors.

33. The luminescent-film-coated product according to claim 32, wherein the thickness of the $TiO_2$ coating ranges from 20 to 160 nm.

34. The luminescent-film-coated product according to claim 31, wherein the shiny pigment comprises glass flakes coated with a silver, gold, or nickel coating having a thickness of 30 to 200 nm.

35. The luminescent-film-coated product according to claim 31, wherein the glass flakes have an average particle diameter of 5 to 500 µm, an average thickness of 0.1 to 5 µm, and an average aspect ratio of 5 to 300.

36. The luminescent-film-coated product according to claim 31, wherein the glass composition of the glass flakes is C-glass or E-glass.

37. The luminescent-film-coated product according to claim 31, wherein the first layer transparent resin matrix and the second layer transparent resin matrix comprise acrylic resin or polycarbonate resin.

38. The luminescent-film-coated product according to claim 31, wherein the content of the shiny pigment in the first layer is 0.1% to 30% by mass of the total amount of the transparent resin matrix and the shiny pigment.

39. The luminescent-film-coated product according to claim 31, wherein the first layer has a thickness of 5 to 150 µm.

40. The luminescent-film-coated product according to claim 31, wherein the content of the at least one of the phosphorescent material and the fluorescent material in the second layer is 1% to 50% by mass of the total amount of the transparent resin matrix and the at least one of the phosphorescent material and the fluorescent material.

41. The luminescent-film-coated product according to claim 31, wherein the second layer has a thickness of 10 to 200 µm.

42. The luminescent-film-coated product according to claim 31, wherein the first and second layers have a total thickness of 15 to 250 µm.

43. The luminescent-film-coated product according to claim 31, which is a sign.

44. The luminescent-film-coated product according to claim 31, which is a position sign.

45. The luminescent-film-coated product according to claim 31, which is an ornament.

* * * * *